United States Patent
Louis

(10) Patent No.: US 11,108,277 B2
(45) Date of Patent: Aug. 31, 2021

(54) WIRELESS POWER TRANSFER CONTROL BASED ON REQUIRED AND RECEIVED POWER ERROR

(71) Applicant: Apple Inc., Cupertino, CA (US)

(72) Inventor: Jeffrey Douglas Louis, Freemans Bay (NZ)

(73) Assignee: Apple Inc., Cupertino, CA (US)

( * ) Notice: Subject to any disclaimer, the term of this patent is extended or adjusted under 35 U.S.C. 154(b) by 166 days.

(21) Appl. No.: 16/111,849

(22) Filed: Aug. 24, 2018

(65) Prior Publication Data

US 2019/0068004 A1    Feb. 28, 2019

Related U.S. Application Data

(60) Provisional application No. 62/550,327, filed on Aug. 25, 2017.

(51) Int. Cl.
*H02J 50/80* (2016.01)
*H02J 50/12* (2016.01)
*H02J 50/90* (2016.01)

(52) U.S. Cl.
CPC .............. *H02J 50/80* (2016.02); *H02J 50/12* (2016.02); *H02J 50/90* (2016.02)

(58) Field of Classification Search
CPC . H02J 50/80; H02J 5/005; H02J 7/025; B60L 53/12–126
See application file for complete search history.

(56) References Cited

U.S. PATENT DOCUMENTS

| | | | | |
|---|---|---|---|---|
| 2007/0228833 A1* | 10/2007 | Stevens | ................... | H02J 50/12 307/45 |
| 2011/0196544 A1* | 8/2011 | Baarman | ................. | H01F 38/14 700/291 |
| 2012/0244822 A1* | 9/2012 | Kim | ...................... | G01R 27/04 455/90.1 |
| 2013/0094598 A1* | 4/2013 | Bastami | .................. | H02J 50/60 375/259 |
| 2013/0285618 A1* | 10/2013 | Iijima | ..................... | H02J 50/10 320/137 |
| 2014/0015334 A1* | 1/2014 | Jung | ........................ | H02J 50/60 307/104 |
| 2014/0339908 A1* | 11/2014 | Omae | ..................... | H02J 50/60 307/104 |
| 2015/0207333 A1 | 7/2015 | Baarman et al. | | |
| 2015/0303714 A1* | 10/2015 | Keeling | .................. | H02J 50/40 320/108 |
| 2015/0340880 A1* | 11/2015 | Kdoshim | ............... | H02J 7/025 307/104 |
| 2016/0204616 A1* | 7/2016 | Liu | ........................ | H02J 50/10 307/104 |
| 2016/0294195 A1* | 10/2016 | Fei | ...................... | H02J 7/00034 |

(Continued)

*Primary Examiner* — Hal Kaplan
*Assistant Examiner* — David A Shiao
(74) *Attorney, Agent, or Firm* — Blank Rome LLP

(57) ABSTRACT

A system for wireless power transfer control comprising a receiver for receiving and consuming power, a transmitter for transmitting power, wherein the receiver is configured to generate and send a message to the transmitter, the transmitter is configured to control an output level transmitted to the receiver based on the message, and wherein the receiver or the transmitter is configured to perform a corrective action if a magnitude of the message exceeds a power error threshold for a threshold time.

25 Claims, 9 Drawing Sheets

(56) References Cited

U.S. PATENT DOCUMENTS

2017/0093225 A1\* 3/2017 Murayama .............. B60L 53/12
2017/0098991 A1\* 4/2017 Takahashi ............... H02M 1/08
2017/0288462 A1\* 10/2017 Suzuki .................... H02J 50/80
2018/0316391 A1\* 11/2018 Hijikata .................. H02J 50/10

\* cited by examiner

WIRELESS POWER TRANSFER CONTROL BASED ON REQUIRED AND RECEIVED POWER ERROR

TECHNICAL FIELD

This disclosure relates to wireless power transfer control or wireless power system construction and/or operation, in particular but not limited to optimisation of system operating parameters and/or system component protection.

BACKGROUND

A wireless power transfer system comprises a transmitter and a receiver that are spaced apart from each other at a particular distance. One example of a wireless power transfer system is an inductive power transfer (IPT) system that uses magnetic or electromagnetic induction as a mechanism of power transfer between the transmitter and receiver.

Wireless power transfer typically requires communication between a transmitter and a receiver. For example, the Qi wireless charging standard defines a "baseline power profile" (BPP) communication protocol for power transfer limited to 5 W. The Qi standard also defines an "extended power profile" (EPP) communication protocol to facilitate wireless charging power levels of up to 15 W. The EPP protocol requires backward compatibility with BPP, meaning that a 15 W EPP device should operate with a BPP 5 W receiver and an EPP receiver of up to 15 W.

If the receiver is momentarily moved out of the transmission distance (i.e. out of the magnetic field) of the transmitter that causes the receiver to deplete stored energy within its own or connected load capacitances and subsequently is quickly re-introduced into the magnetic field while the transmitter is continuously operating, the receiver may be exposed to a maximum output from the transmitter whilst the receiver is operating and delivering power to its connected load. This arises when the transmitter is at full output (i.e. full power) in order to try to keep the receiver powered at a maximum distance, and the receiver with partially depleted internal or connected load capacitances is quickly placed within an operational coupling distance from the transmitter, with the consequence of presenting a significantly lower equivalent reflected load impedance to the transmitter and thus an extraordinarily higher system quality factor 'Q' with the effect of reducing the effective net ballast impedance between the transmitter primary coil(s) and the receiver secondary coil circuits. The higher system Q values has the consequence of allowing significantly higher electric current to flow whilst the transmitter is in a given operating state that was appropriate for the receiver with more fully charged capacitances in the receiver or its connected load. This may occur before the transmitter has had a chance to reset or switch off or lower its output in accordance with existing regulation methods or system protection/reset protocols.

Removing and quickly reintroducing an active receiver (i.e., the receiver is not shutdown or in standby) onto a transmitter, while the transmitter is at maximum output may occur with any combination of BPP and EPP receivers and transmitters. A 5 W BPP receiver may also be affected if a 15 W EPP receiver is quickly replaced by a 5 W BPP receiver, onto a 15 W EPP transmitter. The 5 W BPP receiver may become exposed to a high magnetic field strength (i.e. maximum output of the transmitter) that the 5 W BPP receiver was not designed to operate within (since 15 W transmitters were not typical or even conceived when most 5 W receivers were designed and produced), thereby exceeding the capacity of the 5 W BPP receiver.

In this specification where reference has been made to patent specifications, other external documents, or other sources of information, this is generally for the purpose of providing a context for discussing the features. Unless specifically stated otherwise, reference to such external documents or such sources of information is not to be construed as an admission that such documents or such sources of information, in any jurisdiction, are prior art or form part of the common general knowledge in the art.

SUMMARY

In one aspect there is provided a system for wireless power transfer control comprising: a receiver for receiving and consuming power, a transmitter for transmitting power, wherein the receiver is configured to generate and send a message to the transmitter, wherein the transmitter is configured to control an output level transmitted to the receiver based on the message, and wherein the receiver or the transmitter is configured to perform a corrective action if a magnitude of the message exceeds a power error threshold for a threshold time.

In another aspect there is provided a receiver for use in a wireless power transfer control system, the receiver being for receiving and consuming power wherein the receiver is configured to: generate and send a message to the transmitter, and perform a corrective action if a magnitude of the message exceeds a power error threshold for a threshold time.

In another aspect there is provided a transmitter for use in a wireless power transfer control system, the transmitter being for transmitting power, wherein the transmitter is configured to control, in use, an output level transmitted to a receiver based on a message received from the receiver, and wherein the transmitter is configured to perform a corrective action if a magnitude of the message exceeds a power error threshold for a threshold time.

The message may be indicative of a difference between a required current or voltage at the receiver, and a received current or voltage at the receiver.

The threshold time may correspond to a minimum time period.

The message may be a power error message. The message may be indicative of a difference between a required current or voltage or power and a received current or voltage or power. The message may be generated by the receiver.

The message may be a control error packet. The threshold may be 60, or 120, or 127. The threshold may be between 60 and 120. In one example the threshold may be +64 or +127. In one example a magnitude or absolute value of the message is compared against the threshold, and wherein the threshold may be defined as an absolute value.

Alternatively the threshold may be defined as a positive or negative number. In one example the threshold may be +60 or −60. In another example the threshold may be defined as a total between a positive maximum and a negative maximum, for example the threshold may be 120.

The threshold time may be less than approximately 1.8 seconds.

The threshold time may be in the millisecond range.

The threshold time may be less than 500 milliseconds, and in an example implementation may be approximately 10 milliseconds.

The threshold time may be between 250 and 500 milliseconds. The threshold time may be greater than an active time threshold, wherein the active time threshold is a response time period for the transmitter to respond to changes in the message. In one example the active time threshold may be less than 30 milliseconds.

Alternatively the threshold time may be greater than or equal to 30 milliseconds but less than or equal to 700 milliseconds, and in an example the threshold time be greater than or equal to 50 milliseconds and less than or equal to 500 milliseconds.

In an alternative configuration the threshold time may be 30 milliseconds, and in an example implementation may be approximately 10 milliseconds.

The threshold time may be less than a time constant of a load of the receiver or a time constant of the receiver or wherein the threshold time is less than an RC time constant of a load circuit in the receiver. The threshold time may be greater than a time constant of a load of the receiver or a time constant of the receiver or an RC time constant of a load circuit in the receiver.

The receiver or transmitter may be configured to perform a corrective action if the magnitude of the message exceeds a threshold.

The receiver may take a corrective action, wherein the corrective action may be one or more of: isolating a load of the receiver, disconnecting a load of the receiver, opening one or more rectifier switches, opening an LDO or activating an output disconnect to isolate the load.

The transmitter may take a corrective action, wherein the corrective action may be one or more of switching off the transmitter or placing the transmitter in a standby mode or placing the transmitter in a low power mode such as reverting to the Digital Ping operating level specified by the Qi standard.

The receiver may comprise a receiver coil, a receiver controller and a load, wherein the receiver controller performs a corrective action if a magnitude of the message exceeds an error threshold for a threshold time.

The transmitter comprises a transmitter coil, an inverter for coupling to a power supply, a transmitter controller, wherein the controller performs a corrective action if a magnitude of the message exceeds a power error threshold for a threshold time.

In another aspect there is provided a system for wireless power transfer control comprising: a receiver for receiving and consuming power, a transmitter for transmitting power, wherein the receiver is configured to generate and send a message to the transmitter, the transmitter is configured to control a power level transmitted to the receiver based on the message, wherein the transmitter is configured to set an output threshold when the message indicates an equilibrium state, and to perform a corrective action if the output from the transmitter exceeds the output threshold.

In another aspect there is provided a transmitter for use in a wireless power transfer control system, the transmitter being for transmitting power, wherein the transmitter is configured to control, in use, a power level transmitted to a receiver based on a message received from the receiver, and wherein the transmitter is configured to set an output threshold when the message indicates an equilibrium state, and perform a corrective action if the output from the transmitter exceeds the output threshold.

The equilibrium state may be indicated when the magnitude of the message is at, near to or holds an average value of 0.

The output threshold may be set when the message is 0.

The output from the transmitter may be a voltage or current or power or a ratio of voltage to current.

The corrective action may be one or more of: switching off the transmitter or placing the transmitter in a standby mode (such as returning to Selection phase in the Qi standard) or placing the transmitter in a low power mode (such as returning to Digital Ping, Identification, Configuration, Negotiation, Calibration or a point within or at the end of one of these phases defined by the Qi standard).

The transmitter's output threshold may be determined in the field to be a value over 100% or a proportional value such as 150% of an output value that is gauged/sampled from the system when the message indicates an equilibrium state.

The transmitter may be configured to perform a corrective action if the output exceeds the output threshold, when the message exceeds a threshold for a threshold time.

The threshold may comprise an absolute value of 64 or 127.

The threshold time may be in the millisecond range or approximately 10 milliseconds.

In another aspect there is provided a wireless power transfer system comprising: a receiver for receiving and consuming power, a transmitter for transmitting power, wherein the receiver is configured to generate and send a message to the transmitter, the transmitter is configured to control a power level transmitted to the receiver based on the message, wherein the transmitter is configured to: monitor the message, set an output threshold when the message indicates an equilibrium state, and perform a corrective action if the output slope exceeds an output slope threshold.

In another aspect there is provided a transmitter for use in a wireless power transfer control system, the transmitter being for transmitting power, wherein the transmitter is configured to control, in use, a power level transmitted to a receiver based on the message received from the receiver, and wherein the transmitter is configured to: monitor the message, set an output threshold when the message indicates an equilibrium state, and perform a corrective action if the output slope exceeds an output slope threshold.

In another aspect there is provided a method for wireless power transfer control comprising: generating and transmitting a message to a transmitter, controlling an output level transmitted to a receiver based on the message, and performing a corrective action if a magnitude of the message exceeds a power error threshold for a threshold time, wherein the corrective action is performed either by the transmitter or receiver.

In another aspect there is provided a method for wireless power transfer control comprising: in a receiver, generating and transmitting an message to a transmitter, and performing a corrective action if a magnitude of the message exceeds a power error threshold for a threshold time.

In another aspect there is provided a method for wireless power transfer control comprising: in a transmitter, controlling an output level transmitted to a receiver based on the message received from the receiver, and performing a corrective action if a magnitude of the message exceeds a power error threshold for a threshold time.

In another aspect there is provided a method for wireless power transfer control comprising: monitoring a message, setting an output threshold when the message corresponds to an equilibrium state, and performing a corrective action if the output from a transmitter exceeds the output threshold.

In another aspect there is provided a method for wireless power transfer control comprising: in a transmitter, monitoring a message received from a receiver, setting an output threshold when the message corresponds to an equilibrium state, and performing a corrective action if the output from a transmitter exceeds the output threshold.

In a further aspect there is provided a transmitter of a wireless power transfer system, the transmitter comprising: a transmitting coil, a controller configured to communicate with a receiver to at least receive a message, the transmitter configured to control a voltage or current or power level transmitted to a receiver based on a magnitude or value of the message, and wherein the transmitter is further configured to perform a corrective action if the message exceeds a threshold for a threshold time.

In a further aspect there is provided a transmitter of a wireless power transfer system, the transmitter comprising: a transmitting coil, a controller configured to communicate with a receiver to at least receive a message, the transmitter configured to control an output transmitted to a receiver based on a magnitude or value of the message, and wherein the transmitter further configured to monitor the message, set one or more output thresholds when the message indicates an equilibrium state between the transmitter and a receiver, perform a corrective action if the output from the transmitter exceeds the one or more output thresholds.

In yet another aspect there is provided a receiver of a wireless power transfer system, the receiver comprising: a receiving coil, a controller configured to generate an message, and wherein the receiver is configured to perform a corrective action if a magnitude of the message exceeds an error threshold for a threshold time.

The threshold time may be in the millisecond range. The threshold time may be less than a time constant (e.g. an RC constant) of a load circuit of the receiver. In one example the threshold time may be 10 milliseconds.

The corrective action performed by the transmitter may be any one or more of switching off the transmitter or placing the transmitter in a standby mode or placing the transmitter in a low power mode.

The corrective action performed by the receiver may be any one or more of isolating a load of the receiver, disconnecting a load of the receiver, opening one or more rectifier switches, opening an LDO or activating an output disconnect to isolate the load.

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in a similar manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

The use of the term "coil" herein is meant to designate inductive "coils" in which electrically conductive wire is wound into a three dimensional shape or two dimensional planar shapes. Some example shapes are helix or concentric circles or turns. The term "coil" can also mean an electrically conductive material fabricated using PCB techniques into three dimensional coil shapes over plural PCB layers or two dimensional planar coil shapes. The use of the term "coil" or relates terms such as "coils" is not meant to be restrictive.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term '(s)' following a noun means the plural and/or singular form of that noun.

As used herein the term 'and/or' means 'and' or 'or', or where the context allows both.

BRIEF DESCRIPTION OF THE DRAWINGS

Implementations will now be described by way of example only and with reference to the accompanying drawings in which.

DETAILED DESCRIPTION

Example implementations follow of wireless power transfer control, in particular but not limited to inductive power transfer control. These relate generally to a system, an apparatus and/or a method for wireless power transfer control. These implementations will be described with reference to controlling inductive power transfer, including management of magnetic field strength and operating level in wireless power transfer, e.g. inductive power transfer.

Figure 1:
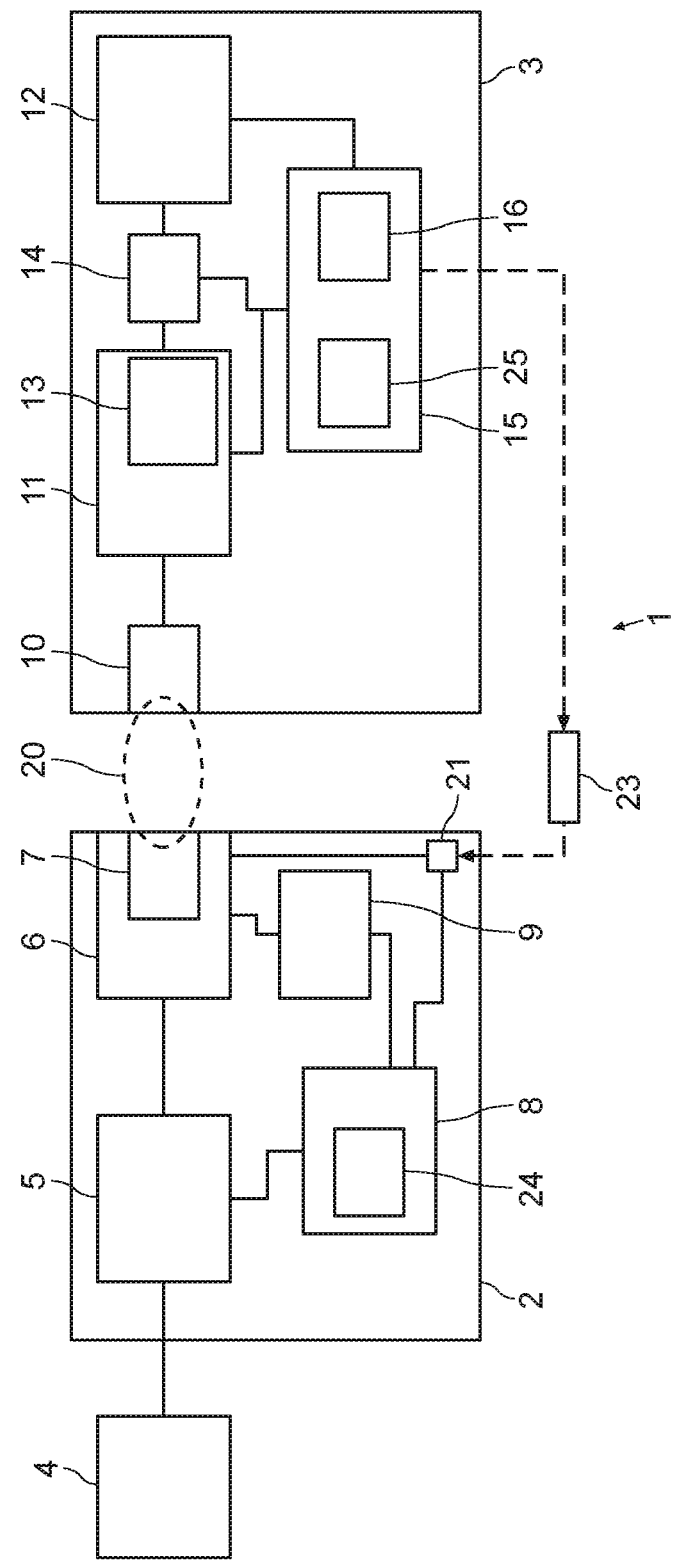
FIG. 1 shows a block diagram of an inductive power transfer system.

FIG. 1 shows a diagram of a general inductive power transfer (IPT) system. The IPT system includes an inductive power transmitter 2 and an inductive power receiver 3. The inductive power transmitter 2 is connected to an appropriate power supply 4, such as mains power or a battery or a generator. The inductive power transmitter 2 may include transmitter circuitry having one or more of a converter 5 and an inverter 6. The converter 5 may be an AC-DC converter subject to the type of power supply being used. The inverter 6 is electrically coupled to the converter 5, if present.

The transmitter 2 comprises one or more primary coils 7. In the illustrated example the transmitter 2 comprises a single transmitting coil 7 (i.e. primary coil). The inverter 6 is electrically coupled to the transmitter coil 7 (i.e. primary coil). The inverter 6 supplies the transmitting coil 7 with an AC signal so that the transmitting coil 7 generates an alternating magnetic field 20. The transmitting coil 7 may be separate from the inverter 6, but in some configurations may be part of the inverter 6. In some configurations the transmitting coil 7 (i.e. primary coil) may be connected to one or more capacitors (not shown) either in parallel or series to create a resonant circuit. The transmitting coil 7 may also be connected to other suitable electronic components such as for example a smoothing circuit to reduce voltage surges.

The transmitter 2 may comprise a controller 8. The controller 8 may be connected, either directly or indirectly, to each part of the transmitter 2. The controller may be adapted to receive inputs from each part of the transmitter 2, process these inputs and generate outputs (e.g. control signals) that control operation of one or more parts of the transmitter 2. The controller be implemented as a single unit or may be implemented as separate units. The controller 8 may be configured to control various aspects of the transmitter 2 depending on its capabilities, including for example; power flow, tuning, selectively energising the transmitting coil or coils 7, receiver detection and communications. The controller 8 may also receive and process messages (for example, error indicators or error signals) from the receiver 3.

In some configurations the transmitter 2 may also include a separate communications unit 21 that is configured to communicate with the receiver 3. In one example implementation the communications unit is arranged to detect load modulated signals impressed on the current through the coil 7 by the receiver 3. The communications unit may receive and process messages (for example, error indicator or error signals) 23 from the receiver 3. In some configurations the communications unit may be integral with the controller 8. The transmitter 2 may also include a current sense unit 9 that is configured to sense current through the primary coil 7. The current sense unit 9 is in electronic communication with at least the controller 8 and may cause the controller 8 to perform a corrective action e.g. shutdown the inverter or disconnect the power supply if the current through the primary coil 7 exceeds a threshold. Alternatively the current sense unit 9 may be a passive unit that simply reads out a current value to the controller 8.

The inductive power receiver 3 includes one or more receiving coils 10(i.e. secondary coil or coils). In the illustrated example the receiver 3 includes a single coil 10(i.e. secondary coil). The receiver 3 also includes receiver circuitry which may include power conditioning circuitry 11 that supplies power to a load 12. The load 12 may be any suitable load such as for example a battery charger unit.

In use, the transmitter 2 and receiver 3 are suitably coupled by a magnetic field 20. The transmitter 2 and receiver 3 are physically spaced apart from each other. The alternating current through the transmitting coil 7 (i.e. primary coil) causes generation of an alternating magnetic field emanating from the transmitting coil 7. The alternating magnetic field 20 generated by the transmitting coil 7 induces an alternating current in the receiving coil 10 due to magnetic induction. The power conditioning circuitry 11 is configured to convert the induced current into a form that is appropriate for the load 12 and may include series and/or shunt capacitors that together with the inductance of coils 7 and 10 and operating frequency of inverter 6 implement a compensating ballast impedance for the mutual inductance created by the physical separation of coils 7 and 10. The power conditioning circuitry 11 may include a rectification circuit 13, and optionally a regulator circuit. The rectification circuit 13 may be any suitable rectification circuit such as for example a full bridge rectifier and may also include one or more rectifier switches (not shown). The rectifier switches may be electronically controlled by a suitable controller described later.

The receiver 3 may also comprise an output disconnect 14 circuit that is connected between the load 12 and the receiving coil 10. The output disconnect 14 is configured to disconnect the load 12 if abnormal conditions are detected. The output disconnect 14 may be an LDO (low dropout regulator), buck/boost regulator or any other suitable switching circuit or switching unit. The output disconnect 14 unit or circuit may be controlled by a suitable controller.

The receiver 3 may comprise a controller 15. The controller 15 is configured to control operation of one or more components of the receiver 3. For example the controller 15 may control the operation of the output disconnect or the rectifier switches. The controller 15 may be any suitable electronic controller and includes a processor. The controller 15 may include a local memory such as flash memory or a cache to at least temporarily store data or act as a buffer.

The receiver 3 further comprises a communication unit 16. In one configuration communication unit 16 may be integral with or part of the controller 15. The communication unit 16 may also be connected to a communications modulator and communications demodulator. The communications unit 16 of the receiver is configured to communicate with the controller 8 or the corresponding communication unit 21 of the transmitter 2. The communication from the receiver 3 helps to control the power output from the transmitter i.e. control voltage or current in the transmitter to regulate the field strength thereby controlling the induced voltage in the receiver 3.

In one configuration the receiver 3 is configured to transmit messages (for example, error indicators or error signals) 23 to the transmitter 2 that denotes the difference between the power need of the receiver 3 and the power provided by the transmitter 2. The messages (e.g. error indicator or error signals) are transmitted as part of the communication between the receiver 3 and the transmitter 2. The receiver 3 acts as the master to control the output of the transmitter such that the output (i.e. voltage and/or current) received at the receiver 3 matches the needs of the receiver 3.

The receiver coil 10 may be connected to one or more capacitors (not shown) either in series or parallel to create a resonant circuit. The load 12 may also be connected to a capacitor to create an RC circuit. The capacitor connected to the load 12, may be part of the load or may be part of the output disconnect unit or circuit 14 or may be connected in between the load 12 and the output disconnect 14. The capacitor connected to the load 12 may be in connected in parallel or series with the load, and to also help smooth voltage delivered across the load.

In one example implementation of the wireless power transfer system 1 is for wirelessly charging devices such as mobile phones or tablets. The transmitter 2 and its components may be disposed within a wireless charging station such as charging mat or charging pod. The receiver 3 and its components may be disposed within the device to be charged e.g. a mobile phone or a tablet or any other suitable electronic device.

The transmitter 2 may include an additional control component or functionality 24 which enables the transmitter to perform a corrective action in response to predetermined conditions, as will be described in more detail below. Additionally or alternatively, the receiver 3 may include an additional control component or functionality 25 which enables the receiver to perform a corrective action in response to predetermined conditions, as will be described in more detail below. The additional control component or functionality may be implemented as software controlled algorithms in the transmitter controller 8 or receiver controller 15 for example, however other implementations are possible such as ASIC, FPGA or electronic circuitry.

Figure 2:
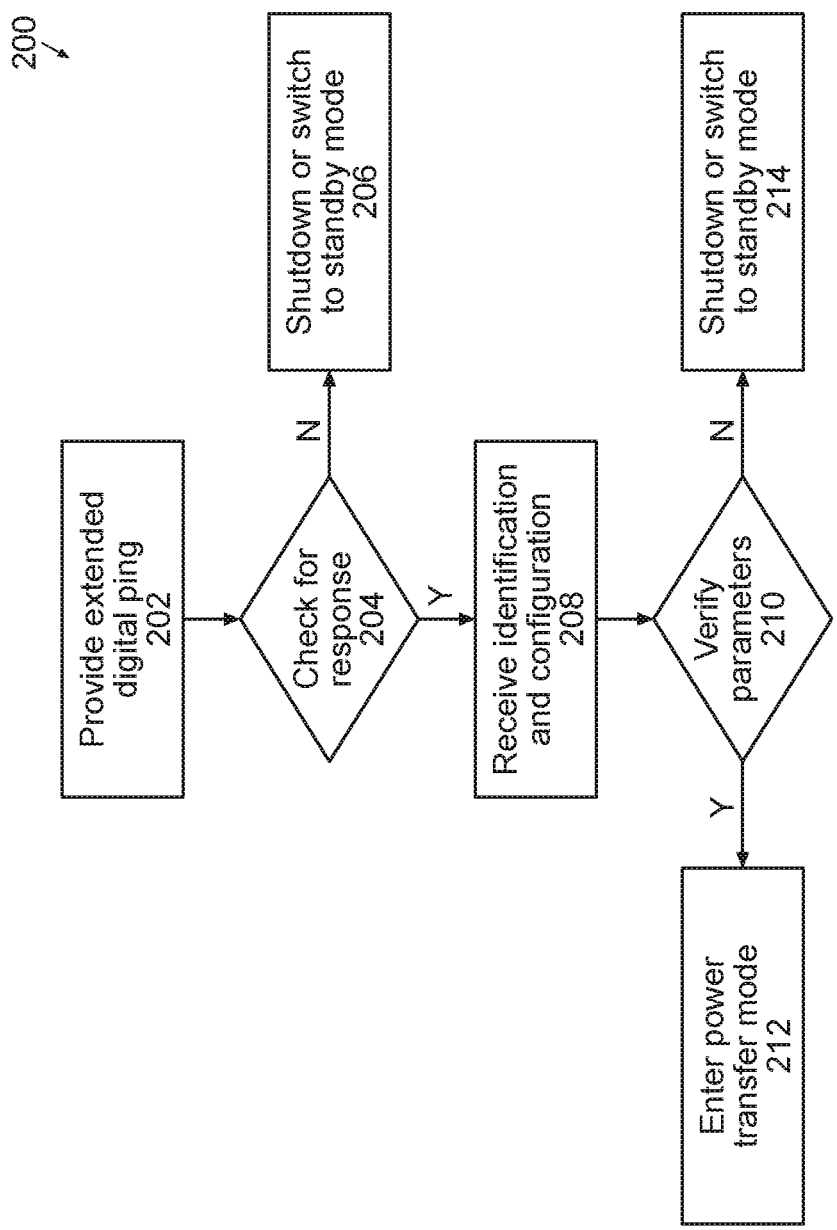
FIG. 2 shows a diagram of power transfer phases executed by the inductive power transfer system.

Operation of the inductive power transfer system 1 will now be described. FIG. 2 shows a diagram of a method of power transfer phases 200 executed by the inductive power transfer system 1. During a start-up operation the receiver 3 complies with a handshaking process to be granted a power contract from the transmitter 2. The power contract is an agreement between the receiver 3 and transmitter 2, that both components are operation and within specified thresholds, such as within an ideal predetermined transmission distance, and includes an agreed power transfer level such as 5 W or 15 W. The transmitter 2 initiates the handshake by beginning the Ping phase with the inverter 6 operating at a defined Digital Ping operating level. If a signal strength packet is consequently received by the transmitter 2 from the receiver 3 then it extends the digital ping at step 202. The digital ping is a low power signal that is applied by the transmitter 2 to the receiver 3. The transmitter checks for a response at step 204. If no response is received at step 204 from the receiver 3, the transmitter 2 aborts the digital ping and the transmitter 2 may be shut down or switched into a standby mode at step 206. The transmitter 2 may be configured to provide an extended digital ping.

At step 208 the receiver 3 is configured to provide the identification and configuration packets to the transmitter 2. The controller 15 and/or the communication unit 16, of the receiver 3, are configured to transmit these packets to the transmitter 2. Generally these are the first three packets transmitted by the receiver 3 to the transmitter 2. These packets may be digital data packets and may be considered a digital signal.

The transmitter 2 enters a power transfer mode at step 212 once the transmitter 2 has successfully received and verified the signal strength, configuration and identification packets from the receiver 3 at step 210. A power transfer contract is established between the transmitter 2 and the receiver 3 in order to enter into the power transfer mode.

If no packets are received or unexpected packets are received by the transmitter 2 during the verification step, the transmitter 2 is configured to shut down or enter a standby mode at step 214. The transmitter controller 8 and/or the transmitter communication unit are configured to receive packets from the receiver and process these received packets. Further during the power transfer mode, if an unexpected packet is received or a time out occurs due to no signals being received by the transmitter 2 from the receiver 3, the power contract is violated and the transmitter 2 and/or the receiver 3 are switched off or placed into a standby mode e.g. a low power mode.

In the power transfer mode the receiver 3 controls operation of the transmitter 2 using a message (i.e. an error indicator or an error signal). In the power transfer mode the receiver 3 acts as a master controller and the transmitter 2 acts as a slave. The messages (i.e. the error indicator or error signal) are control error packets (CEP) that are generated by the receiver 3 and sent to the transmitter 2. The control error packets may be generated and transmitted by either the controller 15 and/or the communication unit 16 of the receiver 3. The message allows closed loop control of the transmitter 2 operation by the receiver 3.

In normal operation the receiver 3 sends an error indicator i.e. control error packets (CEP) to the transmitter to regulate the rectified voltage at the receiver 3, whilst tolerating a wide operating range of load power connected to the receiver 3. The transmitter 2 receives the control error packets and controls the magnetic field strength output to match the level commanded by the receiver 3. The operating level of the transmitter 2 is adjusted or controlled based on the control error packets. In one example the operating level of the transmitter 2 is adjusted or controlled based on the magnitude of the control error packets. In one configuration the voltage or current of the transmitter is adjusted based on the received control error packets.

The control error packets are representative of the difference between a required voltage or current at the receiver and the received voltage or current, at the receiver 3, via induction. The control error packet may be a unit less number and can be a positive or negative value. Alternatively the control error packet may be a value between 0 and a positive number. In one example the control error packet may be a digital word for example an 8 bit packet that is generated and transmitted by the receiver 3. The error indicator i.e. control error packet (CEP) may be a voltage error indicator. Alternatively the control error packet may be a current error indicator.

An error indicator (i.e. control error packet) magnitude (value) of 0 denotes system equilibrium. An error indicator magnitude of 0 denotes the receiver 3 power needs (i.e. voltage and/or current needs) are being met without surplus or deficit by the transmitter 2. The transmitter 2 controller 8 and/or the communication unit interprets the received control error packet value and controls the output of the transmitter. The error indicator may be considered a power error indicator as it denotes a difference between the received power at the receiver as compared to the required or desired power at the receiver, or vice versa.

A Qi compliant transmitter is designed to shut down in response to certain conditions such as for example undesirable levels of power loss induced due to unintended foreign objects or in response to loss of communication between the receiver 3 and the transmitter 2. In some situations the receiver 3 can be bumped or moved or a load change can occur which may otherwise cause an unwanted shutdown, requiring a restart. To prevent unwanted shutdowns a transmitter 2 allows for a "control error packet timeout" of up to 1.8 seconds to elapse between CEP packets (messages) from the receiver 3. If the elapsed time after a control error packet (CEP) exceeds a threshold of at most 1.8 seconds (i.e. the maximum time permitted by the Qi standard), the transmitter 2 is forced into a shutdown mode or a standby mode (i.e. Selection phase or digital ping phase). The transmitter 2 is configured to maintain its last magnetic field operating level until a shutdown or standby mode condition is detected.

For an example case where the receiver 3 is progressively moved away from the transmitter 2 (i.e. progressively moved out of the magnetic field of the transmitter 2), the receiver 3 transmits error indicators (i.e. control error packets) that progressively command the transmitter to increase its power up to its maximum capable level. This is because the receiver 3 does not receive a required level of induced voltage because the receiver 3 is progressively moved out of the magnetic field of the transmitter. Therefore the CEP messages cause the transmitter 2 to increase the level of the magnetic field by increasing the voltage and/or current through the transmitter coil 7 (i.e. primary coil).

Ordinarily after loss of power at the receiver 3, the receiver 3 may trigger its own shutdown and may cease transmission of error indicators (i.e. control error packets) or the error indicators transmitted by the receiver 3 are corrupted indicating a fault condition. The transmitter 2 is forced into a shutdown mode if error indicators (control error packets) are not received. However the transmitter 2 remains at its maximum field strength operating level for up to 1.8 seconds until the transmitter 2 is forced into shutdown mode. This time period of 1.8 seconds of maximum magnetic field strength operating level is a relatively long time period. This time period of maximum magnetic field strength raises the chances of introducing a lower rating receiver (e.g. a 5 W receiver) onto the transmitter 2, or lifting the receiver 3 away from the transmitter 2 and placing the receiver 3 back onto the transmitter before the error indicator timeout (i.e. control error packet timeout) has expired. These situations may damage the receiver 3 since the transmitter 2 is generally at a high output power and the receiver 3 still has its load 12 connected.

Since the load 12 may typically incorporate capacitances that have become partially discharged due to lifting the receiver away and which is connected to the receiver 3 may present itself as a comparatively low equivalent reflected impedance to the transmitter 2. When the receiver 3 is re-introduced into the transmitter 2 magnetic field the connected load may cause the system's quality factor, 'Q', to become abnormally high i.e. a high system Q. Q is a quality factor (Q=2.pi.f.L/R for series resonant systems). An abnormally high system quality factor Q, consequently leads to abnormally highly resonant compensated power being provided to the receiver 3. This high Q factor occurs due to the output capacitor (not shown), which discharges when the receiver 3 is moved out of the magnetic field and as the receiver 3 loses power transfer. The discharged output capacitor acts as a short circuit if the power transfer between transmitter 2 and receiver 3 is suddenly restarted (e.g. due to the user suddenly reintroducing the receiver into the field). Therefore the receiver 3 or at least the load 12 may be damaged because the load 12 may receive a high power output from the transmitter with a highly compensated ballasting impedance (since the output capacitor presents as a short circuit).

The transmitter 2 may be configured to transmit power up to a first maximum. For example, the transmitter may be a BPP transmitter configured to transmit power up to 5 W or the transmitter may be a EPP transmitter configured to transmit power up to 15 W. The receiver 3 may be configured to receive power up to a second maximum. For example, the receiver may be a BPP receiver configured to receive power up to 5 W or the receiver may be a EPP receiver configured to receive power up to 15 W. In one example embodiment, the second maximum may be less than the first maximum. For example, as would arise if a 15 W EPP transmitter is coupled with a 5 W BPP receiver. It is possible to damage a 5 W BPP receiver if a 15 W EPP receiver on a 15 W EPP transmitter is replaced by a 5 W BPP receiver. The 5 W BPP receiver may become exposed to a high magnetic field strength which may exceed the capacity of the 5 W BPP receiver, and may cause a large current in the 5 W BPP receiver.

The receiver 3 includes an existing protection system. A receiver returns to a "selection phase" (first operating state upon power up) within the Qi specified receiver reset time $t_{reset}$ of 28 milliseconds. This selection phase is typically triggered when the power signal voltage at the receiver rectification circuit 13 is lower than a reset threshold that matches the condition of a transmitter's current in its transmitter coil 7 dropping below 50% of the stable level. Put another way if the rectified voltage at the receiver 3, is less than 50% of the steady state value for 28 milliseconds, the receiver may time out and enter a selection phase (i.e. standby mode) or may be switched off. However if the voltage level across the receiver 3 (specifically the rectifier circuit 13) has not dropped below the reset threshold, it can continue to send error indicators (i.e. control error packets) to the transmitter. If the receiver 3 is removed and re-introduced into the magnetic field from the transmitter 2, before a reset has occurred, the connected output load 12 presents a lower equivalent reflected impedance to the high voltage field strength arising from the transmitter 2 ramping out outputs based on the error indicators. The lower impedance is due to a partially discharged capacitor connected to the load 12. The Q value increases in this situation which can cause a large current through the load (due to the lower impedance), which may damage the load 12 or the receiver 3. Similarly if a 5 W BPP receiver is quickly introduced onto a 15 W EPP transmitter, before the 15 W EPP transmitter has shutdown (i.e. within 1.8 s) the 5 W BPP receiver may get damaged due to exposure to a large voltage.

Existing solutions, such as Qi's transmitter protection mechanism, where if the output current of the transmitter exceeds a threshold over what is expected given a transmitter operating point, the system shuts down. This requires the system to be characterised in advance with an expected output current for different operating points. The output current thresholds may be stored in the transmitter 2 within a look table or in a memory of the transmitter. The transmitter 2 is required to be interoperable with any receiver type. The use of different receivers with a transmitter can result in the transmitter thresholds being inaccurate. This can lead to unnecessary shutdowns or damage of the receiver because of failure to shut down the transmitter.

Approaches to controlling wireless power transfer based on monitoring an error indicator will now be described. Controlling wireless power transfer based on monitoring an error indicator can be implemented by the receiver 3 and/or the transmitter 2 in order to control the magnetic field strength or disconnect a load in order to prevent damage of components in the wireless power transfer system because of one of the situations described above e.g. removing and quickly re-introducing the receiver into the magnetic field.

Figure 3:
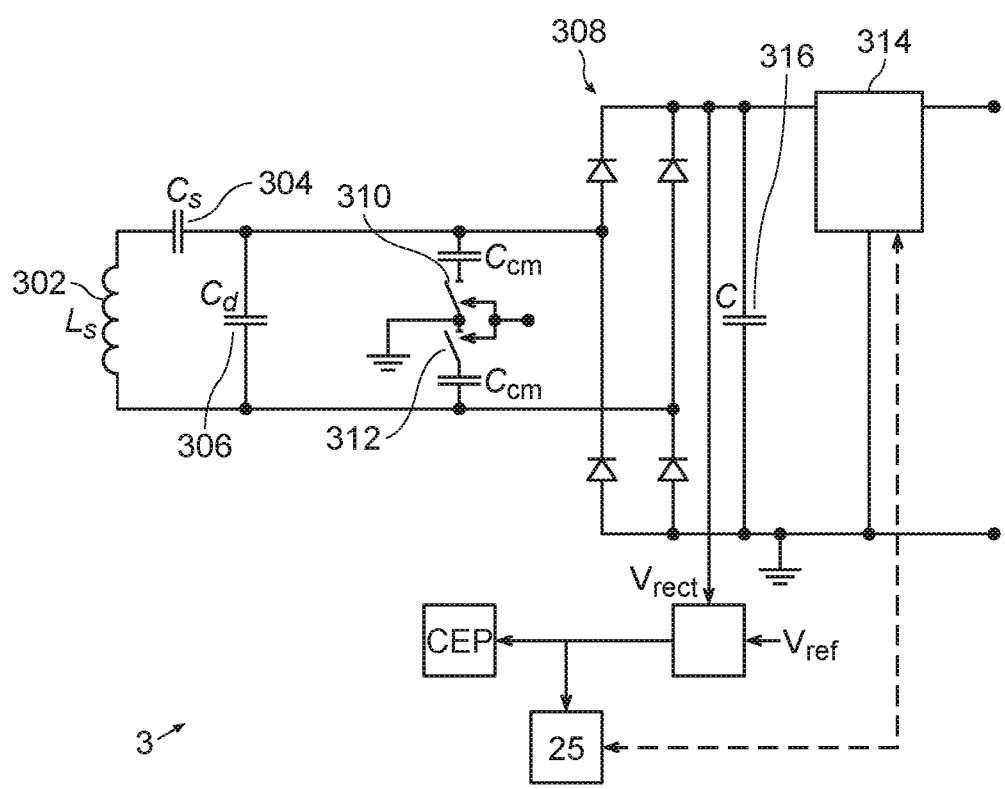
FIG. 3 shows an electrical schematic of an exemplary receiver of an inductive power transfer system.

FIG. 3 shows an electrical schematic of an exemplary receiver 3 of an inductive power transfer system (IPT system). The receiver 3 includes a secondary coil 302 (i.e. Ls) which is coupled to optional capacitors 304 (Cs) and 306 (Cd). The capacitors 304, 306 create a resonant circuit, and may help to smooth voltage surges. The receiver also includes a rectifier circuit 308 that may comprise a plurality of diodes. In one example the rectifier may be a full bridge rectifier. The rectifier 308 may be coupled to one or more switches 310, 312. The switches may be controlled by the controller of the receiver e.g. controller 15. The receiver may also comprise additional capacitors Cm connected to either switch 310, 312 for the purpose of communicating with the power transmitter by load modulation. The receiver also includes an output disconnect 314 that may comprise an LDO or other suitable circuitry. The output disconnect 314 electrically couples to a load (not shown in FIG. 3). The receiver may also include an output capacitor 316.

Figure 4:
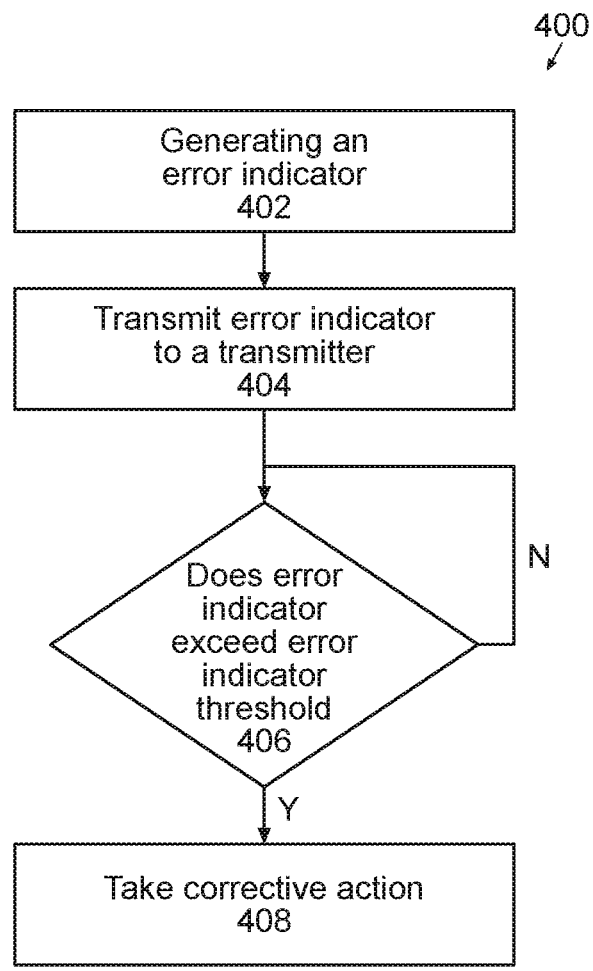
FIG. 4 shows an embodiment of a method of wireless power transfer control based on an error indicator, as implemented by a receiver.

FIG. 4 shows an embodiment of a method of wireless power transfer control 400. The method 400 may be executed by the receiver 3 of the wireless power transfer system 1. The method 400 begins at step 402. Step 402 comprises generating an error indicator based on the received voltage and/or current at the current. The receiver 3 is configured to generate the error indicator (i.e. control error packets). The receiver 3 generates the error indication based on difference between a required voltage (and/or current) and the received voltage (and/or current).

Step 404 comprises transmitting the error indicator to the transmitter 2. The error indicator may be constantly transmitted from the receiver 3 to the transmitter 2 during use to control the operation of the transmitter 2 output. Step 406 comprises checking if the error indicator generated at the receiver exceeds an error indicator threshold for a time threshold.

The receiver 3 is configured to check if the error indicator value exceeds an error indicator threshold for a threshold time. In one example the error indicator threshold is set at +64 and the threshold time is set at 10 milliseconds. Therefore the receiver 3 is configured to perform or take a corrective action if the error indicator exceeds the error indicator threshold for longer than the threshold time (e.g. 10 ms). The threshold time may be in the millisecond range and less than the 1.8 second threshold for transmitter 2 shutoff. The threshold time may be less than the time taken to discharge the output capacitor in the receiver 3.

In another example implementation the threshold time may be between 250 and 500 milliseconds. The threshold time may be greater than an active time threshold, wherein the active time threshold is a response time period for the transmitter to respond to changes in the error indicator. In one example the active time threshold may be less than 30 milliseconds.

Alternatively the threshold time may be greater than or equal to 30 milliseconds but less than or equal to 700 milliseconds, and in an example the threshold time be greater than or equal to 50 milliseconds and less than or equal to 500 milliseconds. In another alternative configuration the threshold time may be 30 milliseconds, and in an example implementation may be approximately 10 milliseconds.

The RC time constant for the RC circuit comprising the load and the output capacitor 316 can be used to set the threshold time. In another configuration the threshold time is less than the time taken to discharge the output capacitor in the receiver 3 (when it is removed from the transmitter) to the system reset threshold (i.e. an under-voltage lockout).

The threshold time may belong enough to account for transient behaviour and to prevent false triggering or false corrective action being taken during operation. For example in some instances the error indicator (CEP value) can increase for a short period of time during transient behaviour.

If the error indicator exceeds an error indicator threshold for at least the threshold time, i.e. if the check at step 406 is 'yes', then the method proceeds to step 408. If no then the method keeps performing step 406. Step 406 may be performed often enough to seem like it is performed in real time.

Step 408 comprises taking a corrective action if the magnitude of the error indicator exceeds an error indicator threshold for a threshold time. The threshold time and the error indicator threshold may be as described earlier. Step 406 may be executed each time a new error indicator is generated.

The corrective action taken by the receiver 3 can include isolating the load. In an example configuration the corrective action taken by the receiver 3 can include one or more of disconnecting the load, switching off the output disconnect 314 (for example, an LDO) or opening the switches 310, 312. The controller 15 is configured to control the switches or the LDO to isolate the load if the error indicator exceeds the error indicator threshold for a threshold time. Alternatively other corrective actions may be taken to isolate the load 12 to protect the load from damage.

Figure 5:
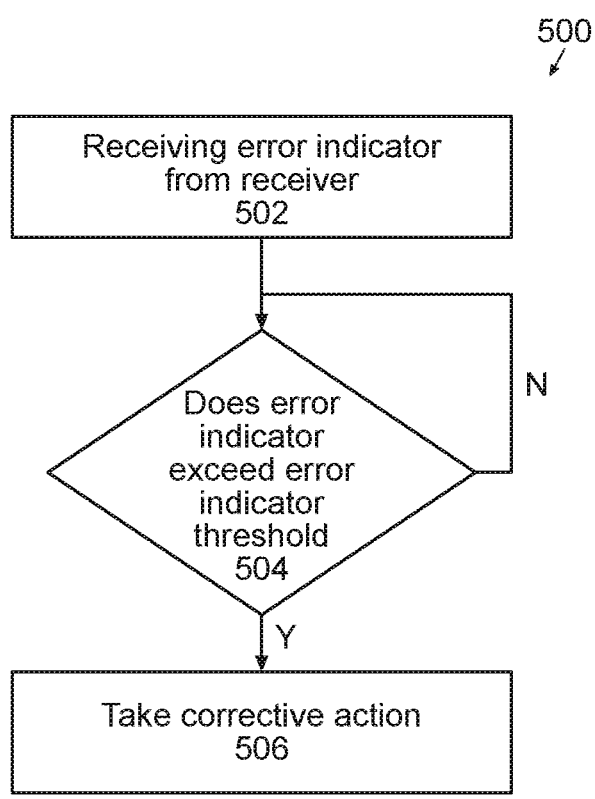
FIG. 5 shows an embodiment of a method of wireless power transfer control based on an error indicator, as implemented by a transmitter.

FIG. 5 shows an embodiment of method of wireless power transfer control 500. The method 500 may be executed by the transmitter 2 of the wireless power transfer system 1.

The method 500 begins at step 502. Step 502 comprises receiving an error indicator from the receiver.

Step 504 comprises checking (i.e. monitoring) the error indicator to determine if the error indicator received by the transmitter 2 exceeds an error indicator threshold for a time threshold. The transmitter 2 is configured to monitor the magnitude or value of the error indicator (i.e. the CEP magnitude) received from the receiver 3.

If the check at step 504 results in a yes then the method proceeds to step 506. If no then the method keeps performing step 504.

Step 506 comprises taking a corrective action if the magnitude of the error indicator exceeds an error indicator threshold for a threshold time. The threshold time and the error indicator threshold may be as described earlier, with reference to the receiver 3. Step 504 may be executed each time a new error indicator is generated. Step 504 may be repeated at a frequency such that the check is performed almost in real time.

The threshold time may be less than 1.8 seconds and may be in the millisecond range. The threshold time may be long enough to allow transient behaviour e.g. the receiver 3 being bumped or moved slightly away from the transmitter 2, or voltage or current surges in the transmitter 2. In one example the threshold time is 10 milliseconds. The threshold time of 10 milliseconds is longer than the PID settling time referred to in the Qi specification as "$t_{active}$". The error indicator threshold may be 64 or any other suitable value.

In an alternative configuration the threshold time may be shorter than the time taken to discharge the output capacitor i.e. the threshold time may be determined based on the RC time constant of the load.

The corrective action performed by the transmitter 2 may be any one or more of: a) disconnecting the power supply from the primary coil, b) setting the operating point to the digital ping level and staying in power transfer mode or c) returning entirely to digital ping mode (i.e. a standby mode). Other corrective actions may be performed by the transmitter 2 to reduce the level of the magnetic field.

Figure 6:
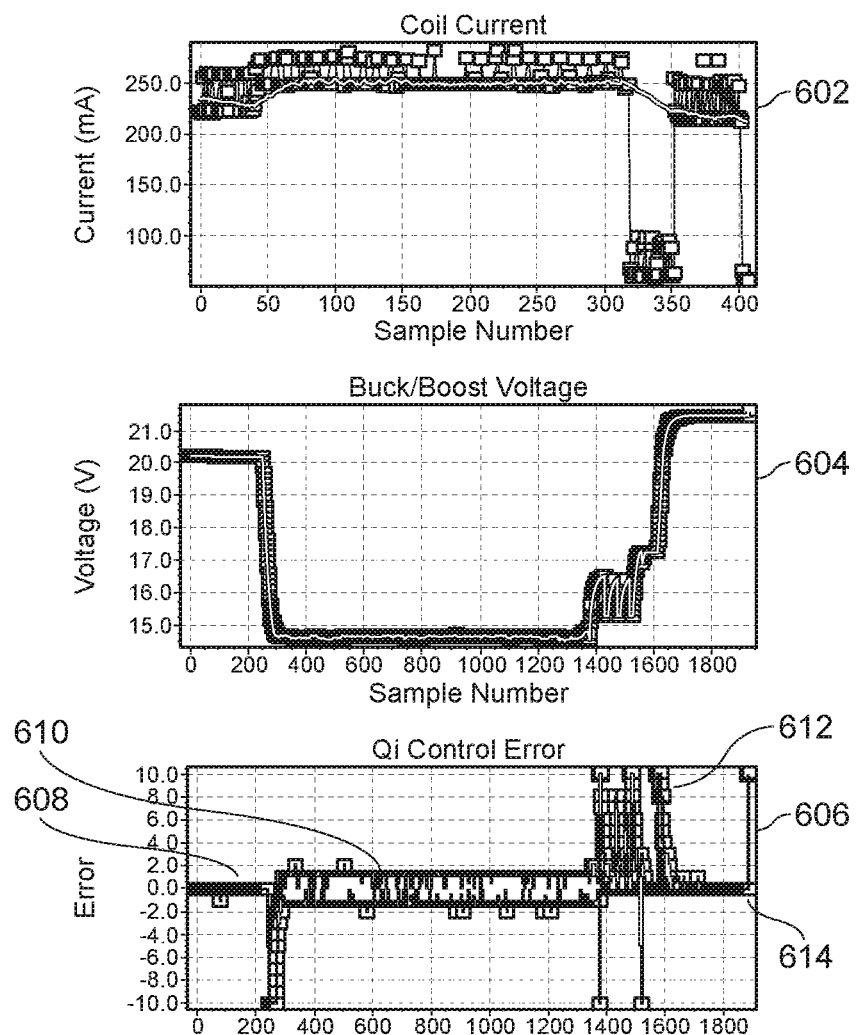
FIG. 6 shows a plot of transmitter coil current, transmitter coil voltage and error indicator (i.e. CEP) when the transmitter is shut down due to removal of the receiver.
Figure 7:
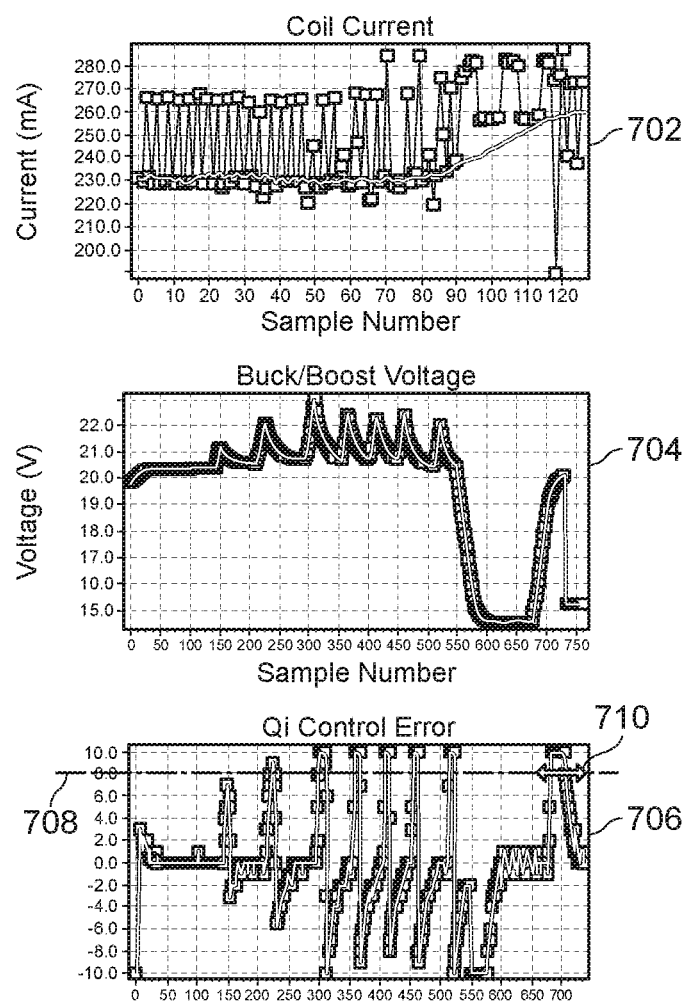
FIG. 7 shows a plot of the transmitter coil current, transmitter coil voltage, and the error indicator (i.e. CEP) during a number of pick up/drop down events when the receiver is picked up away from the transmitter and dropped on to the transmitter.

FIGS. 6 and 7 show exemplary plots of the current and voltage on the transmitter coil 7. FIGS. 6 and 7 also illustrate a plot of the error indicator, i.e. the CEP value, in different situations.

FIG. 6 illustrates the transmitter coil current and transmitter coil voltage, and the CEP values when a transmitter is shut down due to the receiver being removed. As seen in FIG. 6, the current plot 602 and voltage plot 604 correspond to the current and voltage on the transmitter coil 7. The error indicator plot 606 shows a steady state region 608, then a region where the error is stable 610 with some background noise, corresponding to the receiver being removed. The stable region 610 corresponds to the transmitter being in the power transfer phase and in equilibrium with CEP values that have an average value of zero. Once the receiver 3 is reintroduced onto the transmitter, there is a transient region 612 where the CEP rapidly increases for brief short periods after which the transmitter responds by increasing its operating level as the receiver requests more power to support step changes in its connected load power. The error indicator reaches a steady state region 614 that corresponds to an equilibrium being reached between the receiver and transmitter. In this steady state the error indicator i.e. the CEP value is 0.

FIG. 7 shows plots of the transmitter coil current 702, the transmitter coil voltage 704 and the CEP error (i.e. error indicator) 706. The plots in FIG. 7 illustrate a number of pick up/drop down events when the receiver is picked up from the transmitter and placed onto the transmitter. Each pick/drop down event is represented by the voltage peaks and the error indicator peaks. The error indicator and voltage spikes as the receiver 3 is moved away from the transmitter 2. The spike is reduced back to a steady state level when the receiver 3 is placed on the transmitter 2.

The duration of each CEP spike is approximately 500 milliseconds. Plot 706 illustrates an example error indicator threshold 708 set at +8. If error indicator based methods as described with reference to FIG. 4 or 5 are implemented a corrective action would be taken by the receiver and/or the transmitter each time the spike of the error indicator exceeded the threshold 708 for the threshold time 710. Referring to FIG. 7, on plot 706 the corrective action would have been taken at the occurrence of the second spike since the error indicator value exceeded the error indicator threshold for the threshold time 710.

Figure 8:
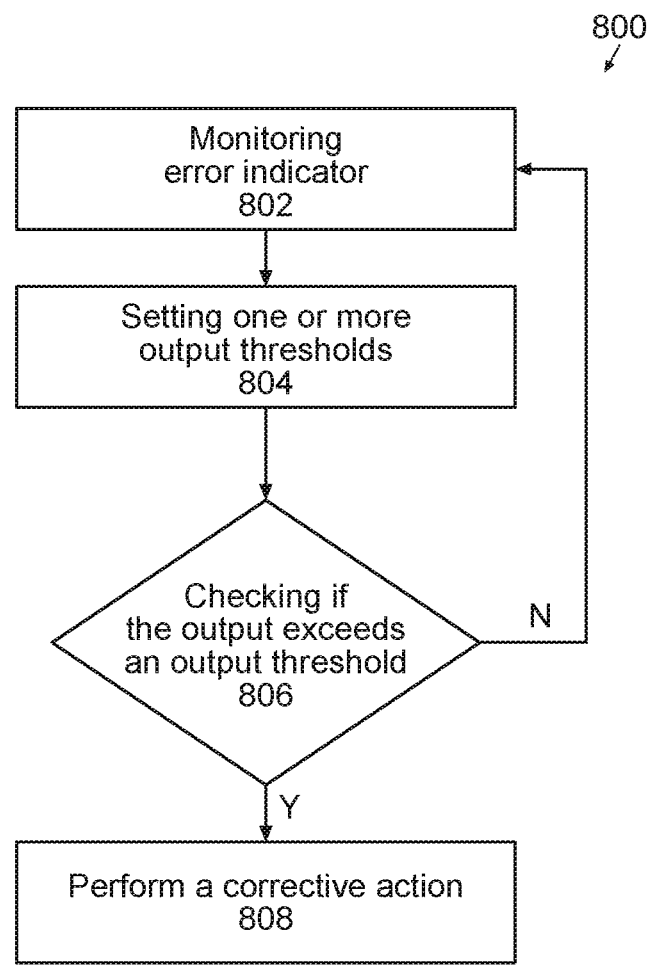
FIG. 8 shows an embodiment of a method of wireless power transfer control based on monitoring the outputs of a transmitter.

A different approach to controlling wireless power transfer will now be described with reference to FIG. 8. The approach to controlling wireless power transfer is based on output monitoring. The approach described in FIG. 8 may be implemented by the transmitter 2.

The method 800 begins at step 802. Step 802 comprises monitoring an error indicator received from receiver. Step 804 comprises setting one or more output thresholds of the transmitter 2, by the transmitter, when the error indicator indicates an equilibrium state between the transmitter 2 and the receiver 3, in use. The transmitter 2 dynamically sets its own output thresholds based on the receiver 3 being used, when the transmitter 2 and receiver 3 are in an equilibrium state (i.e. an optimal use condition).

The transmitter 2 may change thresholds or reset thresholds for each new receiver 3 that is used with the transmitter 2. The output thresholds may relate to a voltage or current at the transmitter primary cell or coil(s) which in turn controls the strength of the magnetic field generated by the transmitter 2.

The transmitter 2 may be configured to set coil output voltage and current thresholds when the error indicator is at a minimum, such as for example when the error indicator is 0. An error indicator (CEP) value of 0 denotes an equilibrium wireless power transmission state between the transmitter 2 and the receiver 3. The transmitter 2 does not need to pre-set thresholds based on some pre-characterisation of the system 1.

The method proceeds to step 806. Step 806 comprises checking if the output or outputs of the transmitter 2 exceed the one or more output thresholds. If the output or outputs exceed the one or more output thresholds, the method proceeds to step 808. Step 808 comprises performing a corrective action if the transmitter 2 output exceeds the output threshold. If the output or outputs do not exceed the one or more output thresholds, the method returns to step 802. The check at step 806 may be repeated constantly at a predetermined frequency. Step 806 may be repeated at a frequency such that the check is performed almost in in real time.

In one example the output threshold may be set at 150% of the output value when the CEP=0 for a minimum time period (i.e. a threshold time). The output may be a voltage (V) or current (I) or a ratio of voltage (V) to current (I) in the transmitter's primary cell or coil(s).

The corrective action performed by the transmitter 2 may be one or more of disconnecting the power supply or switching the transmitter into a standby mode (e.g. a digital ping mode). The controller 8 of the transmitter may be configured to execute the corrective action. In another example the transmitter 2 may be switched off if the output from the transmitter 2 exceeds the output threshold.

The normally expected transient behaviour (due to load power fluctuation) is accounted for and permitted without corrective action by requiring a threshold time before acting upon the magnitude of the error indicator (CEP) exceeding the transmitter error threshold. Ordinarily the response of the transmitter 2 to increase its operating point would cause the CEP value to decrease or increase due to the receiver 3 being moved away from the transmitter 2. However if the distance between the transmitter 2 and the receiver 3 is too large, the transmitter 2 may increase its output until the output saturates. The output thresholds are set when the CEP=0 (i.e. equilibrium), and therefore if the receiver 3 is moved away from the transmitter 2, the output from the transmitter 2 may increase due to the CEP increasing. If the output exceeds the output threshold, the transmitter 2 performs a corrective action.

In another embodiment the output may be a slope of a current or voltage over time. The output threshold may be a predetermined slope of current or voltage over time. As the receiver 3 is removed out of the field of the transmitter, a reduced power consumption may be observed in the rate of change of current or voltage from the transmitter 2. If the rate of change of the output current or voltage i.e. the downward slope of I or V is greater than an output threshold (i.e. downward slope is steeper than the output threshold), the transmitter 2 may take or perform a corrective action. The corrective action may be returning to a digital ping mode (e.g. a standby mode) or disconnecting the power supply. The use of a slope as an output threshold can be used as an extra threshold to provide a fail-safe off mode in the event that the other methods of controlling wireless power transfer are ineffective.

Figure 9:
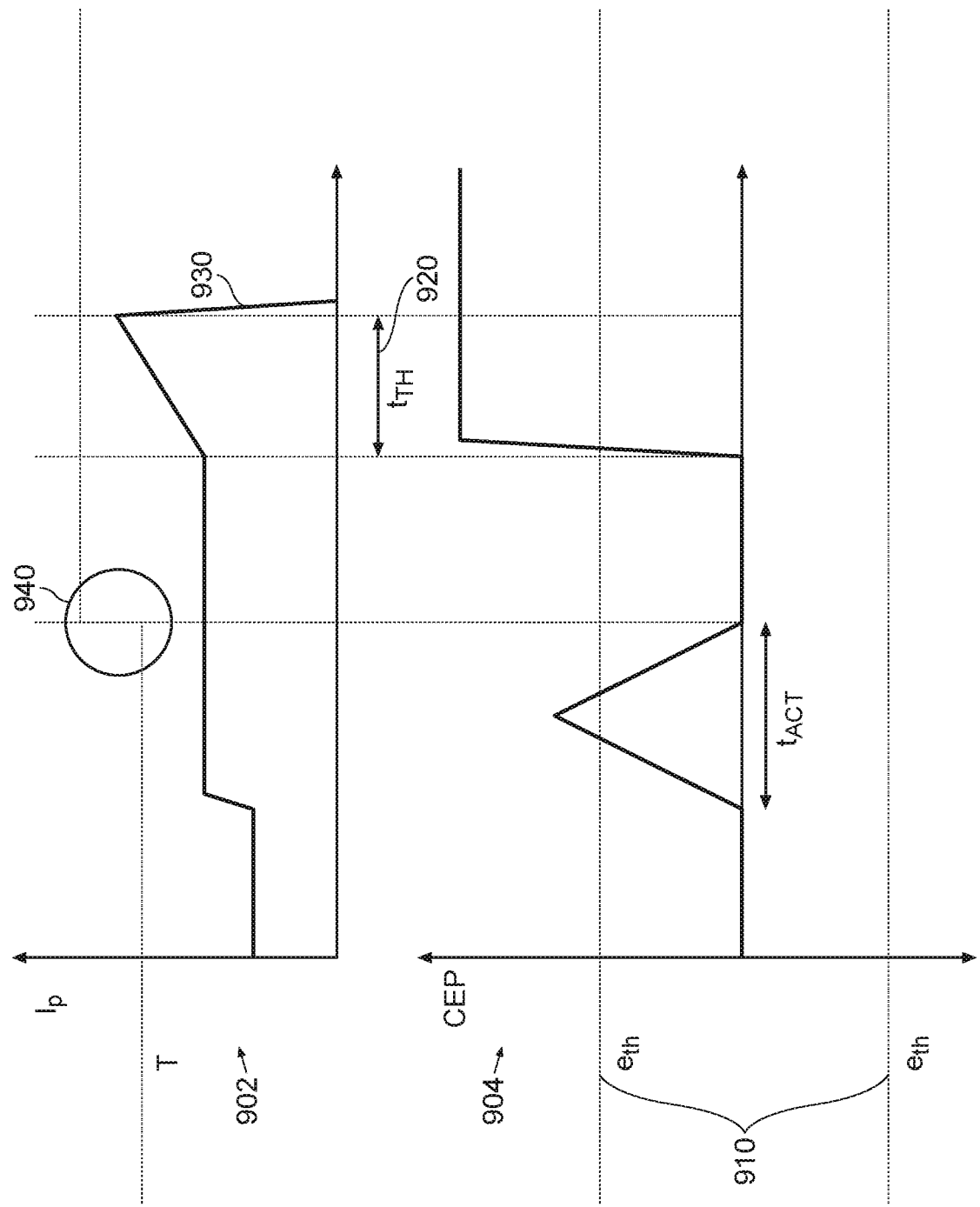
FIG. 9 shows exemplary plots of the current on primary coil and a plot of CEP.

FIG. 9 shows illustrative plots of the current on primary coil 902 and a plot of CEP 904. The Qi standard defines an active time threshold labelled $t_{ACT}$ which is the time taken for the transmitter to respond to receiving a CEP increase. If the CEP value increases for less than the active time threshold the transmitter does not respond. As seen in the plots the CEP value (i.e. error indicator) exceeds an error indicator threshold 910 for the duration of the active time threshold $t_{TH}$. The current on the primary coil is increased to meet the new requirements of the receiver. As the current is increased the CEP value drops to 0 denoting an equilibrium state and that the receiver 3 is receiving the required voltage and/or current. The active time threshold may be between 5 and 30 milliseconds or any other suitable defined value. As shown in plot 904 if the CEP value increases above the error indicator threshold $e_{th}$ the primary coil current increases and continues to increase. If the CEP remains above the error indicator threshold 910 $e_{th}$ for more than a threshold time 920 $t_{TH}$ e.g. greater than or equal to 250 ms or between 250 ms and 500 ms, the current is switched off, and returns to 0, as denoted by 930. If the current does not return to 0 at this stage, the transmitter is configured to monitor the level of the current to check if it exceeds an output threshold T, the transmitter may be switched off or returned to a standby mode e.g. a digital ping mode. The transmitter is also configured to dynamically set the output threshold T as the receiver conditions change. As shown in plot 904, the initial CEP spike indicates a change in the receive conditions e.g. receiver load conditions. The transmitter is configured to reset or change the output threshold, as shown by 940. In the illustrated example the output threshold T is increased in value. The new output threshold is set when the CEP (i.e. error indicator) denotes an equilibrium state, i.e. the CEP=0. The transmitter may reset output thresholds each time the CEP value deviates from 0 and then returns to 0. The new output threshold is computed and set when the CEP is returned to 0. The magnitude or amount of change to the output threshold can be based on one or more parameters which could be receiver related parameters e.g. RC time constant or load value or transmitter related parameters. The new output thresholds are set when the system is in equilibrium so that any deviation from this state can trigger a corrective action. FIG. 9 shows both the output monitoring technique and error indicator monitoring technique working together.

The embodiments described herein may provide a way to manage the magnetic field strength and operating level to protect components in a wireless power transfer system from excessive operating levels. For example the system and method may control the magnetic field strength by reducing current in the primary coil of the transmitter 2 such that the receiver does not see a large spike in voltage due to the high field strength. This in turn helps to protect the receiver 3 and also helps to protect the load 12 in the receiver.

The embodiments described herein may optimise power flow depending on the circumstances e.g. position of the receiver 3 relative to the transmitter. The operating level of the transmitter is regulated based on the conditions of the receiver 3 e.g. the position of the receiver relative to the transmitter 2. This can help to protect the transmitter 2 or its various components from being driven too hard. The operating level is defined by the voltage, current and frequency of the transmitter 2, which in turn defines the strength of the magnetic field.

The method of monitoring the error indicator (i.e. control error packets), comparing the error indicator to an error indicator threshold and taking an appropriate corrective action may allow the receiver 3 to be removed and reintroduced into the magnetic field 20 of the transmitter. The method also does not require education of the user to prevent situations of removing the receiver 3 and reintroducing it into the field 20. The wireless power transfer control may improve the user experience since false triggering and damage may be prevented due to removing and reintroducing the receiver into the field 20.

The method and system of using the error indicator to perform a corrective action may make use of the error indicator values as a monitoring parameter. The error indicator may directly indicate the effectiveness of power transfer to the receiver and thus operation outside a normally acceptable physical parameters e.g. misalignment in the x, y or z axes from the centre of the transmitter 2.

The transmitter 2 is configured to set thresholds dynamically when the system is in equilibrium i.e. when the error indicator (CEP)=0. This mechanism provides corrective action based on the monitored value and is independent of receive type. The error indicator=0 denotes an optimal coupling between the receiver 3 and the transmitter 2. Therefore the transmitter 2 output thresholds are set during the optimal operating conditions. Any deviation from the optimal conditions can be detected and the transmitter 2 can take or perform a corrective action to protect components in the receiver 3 and/or transmitter 2.

The various methods of controlling wireless power transfer may help to protect the receiver 3 and/or the transmitter if the receiver 3 is removed and re-introduced into the field when the transmitter 2 is at its maximum output. The described methods herein may detect, and perform a corrective action if a 5 W BPP receiver is placed on a 15 W EPP transmitter, while the transmitter is at a maximum value.

One of the corrective actions is to return the transmitter to a digital ping mode i.e. a standby mode, which may prevent the receiver 3 from entering a complete system reset or displaying an unexpected end of charging notification.

Embodiments have been described by way of example only and modifications may be made thereto without departing from the scope of the disclosure.

The invention claimed is:

1. A transmitter for wireless power transfer comprising:
a power transmitting coil; and
control circuitry coupled to the power transmitting coil configured to:
receive a plurality of messages from a wireless power receiver, the plurality of messages allowing closed loop control of transmitter operation by the receiver;
monitor error indicators from the plurality of messages, the error indicators representing a magnitude of a difference between a power need of the receiver and power provided by the transmitter;
exert closed loop control of a wireless power transfer output level transmitted to the wireless power receiver based on at least some of the error indicators from the plurality of messages;
determine whether the error indicators exceed a non-zero power error threshold for a threshold time, wherein the threshold time is less than a control error packet timeout of the transmitter, the control error packet timeout being selected to prevent shutdown of the transmitter because of lost communication with the receiver; and
in accordance with determining that the error indicators exceed the non-zero power error threshold for the threshold time, perform a corrective action.

2. The transmitter of claim 1 wherein the error indicators are indicative of a difference between a required current at the receiver and a received current at the receiver.

3. The transmitter of claim 1 wherein the error indicators are indicative of a difference between a required voltage at the receiver and a received voltage at the receiver.

4. The transmitter of claim 1 wherein the plurality of messages are control error packets.

5. The transmitter of claim 1 wherein the control error packet timeout is 1.8 seconds.

6. The transmitter of claim 5 wherein the threshold time is between 50 milliseconds and 1000 milliseconds.

7. The transmitter of claim 6 wherein the threshold time is less than 500 milliseconds.

8. The transmitter of claim 6 wherein the threshold time is 250 milliseconds.

9. The transmitter of claim 1 wherein the threshold time is greater than a time constant of a load of the wireless power receiver.

10. The transmitter of claim 1 wherein the corrective action comprises a corrective action selected from the group consisting of: discontinuing transmission of wireless power using the power transmitting coil to the wireless power receiver, placing the transmitter in a standby mode, and placing the transmitter in a low power mode.

11. The transmitter of claim 1 wherein the transmitter is configured to transmit power up to a first maximum and the wireless power receiver is configured to receive power up to a second maximum that is less than the first maximum.

12. The transmitter of claim 1 wherein the threshold time is greater than a time constant of the wireless power receiver.

13. The transmitter of claim 1 wherein the threshold time is greater than an RC time constant of a load circuit in the wireless power receiver.

14. A transmitter for wirelessly transmitting power comprising:
a power transmitting coil; and
control circuitry coupled to the power transmitting coil configured to:
receive a plurality of messages from a wireless power receiver, the plurality of messages allowing closed loop control of transmitter operation by the receiver;
monitor error indicators from the plurality of messages, the error indicators representing a magnitude of a difference between a power need of the receiver and power provided by the transmitter;
exert closed loop control of a wireless power transfer output level transmitted to the wireless power receiver based on at least some of the error indicators from the plurality of messages;
in response to at least some of the error indicators from the plurality of messages indicating an equilibrium state in which the error indicators do not exceed a non-zero power error threshold, set an output threshold; and
in accordance with determining that an output from the transmitter exceeds the output threshold, perform a corrective action.

15. The transmitter of claim 14 wherein the equilibrium state is indicated when a magnitude of at least some of the error indicators from the plurality of messages is 0.

16. The transmitter of claim 14, wherein the equilibrium state is indicated when an average of a group of at least some of the error indicators from the plurality of messages is within a tolerance range from −2 to +2.

17. The transmitter of claim 14 wherein the corrective action comprises discontinuing transmission of wireless power using the power transmitting coil to the wireless power receiver.

18. The transmitter of claim 14 wherein the transmitter is configured to transmit power up to a first maximum and the wireless power receiver is configured to receive power up to a second maximum that is less than the first maximum.

19. A transmitter for wirelessly transmitting power comprising:
a power transmitting coil; and
control circuitry coupled to the power transmitting coil configured to:
receive a plurality of messages from a wireless power receiver, the plurality of messages allowing closed loop control of transmitter operation by the receiver;
monitor error indicators from the plurality of messages, the error indicators representing a magnitude of a difference between a power need of the receiver and power provided by the transmitter;
exert closed loop control of a wireless power transfer output level transmitted to the wireless power receiver based on at least some of the error indicators from the plurality of messages;
in response to at least some of the error indicators from the plurality of messages indicating an equilibrium state in which the error indicators do not exceed a non-zero power error threshold, set an output slope threshold; and
in accordance with determining that a rate of change of a transmitter output exceeds the output slope threshold, perform a corrective action.

20. A receiver for wireless power transfer comprising:
a power receiving coil; and
control circuitry coupled to the power receiving coil configured to:
send a plurality of messages to a wireless power transmitter, the plurality of messages allowing closed loop control of transmitter operation by the receiver, each message including an error indicator, the error indicator representing a magnitude of a difference between a power need of the receiver and power provided by the transmitter;
receive a wireless power transfer input level transmitted from the wireless power transmitter based on the error indicators;
monitor the error indicators from the plurality of messages;
determine whether the error indicators exceed a non-zero power error threshold for a threshold time, wherein the threshold time is less than a control error packet timeout of the transmitter, the control error packet timeout being selected to prevent shutdown of the transmitter because of lost communication with the receiver; and
in accordance with determining that the error indicators exceed the non-zero power error threshold for the threshold time, perform a corrective action.

21. The receiver of claim 20, wherein the error indicators are indicative of a difference between a required current at the receiver and a received current at the receiver.

22. The receiver of claim 20, wherein the error indicators are indicative of a difference between a required voltage at the receiver and a received voltage at the receiver.

23. The receiver of claim 20, wherein the plurality of messages are control error packets.

24. The receiver of claim 20, wherein the threshold time is less than 1.8 seconds.

25. The receiver of claim 20, wherein the corrective action comprises isolating a load of the receiver.

* * * * *